United States Patent [19]

Schneider et al.

[11] 4,194,988
[45] Mar. 25, 1980

[54] METHOD FOR THE PRODUCTION OF AQUEOUS, FINELY DISPERSED, SHELF-STABLE SILICONE OIL EMULSIONS

[75] Inventors: Wolfgang Schneider; Kurt Niehaves, both of Marl, Fed. Rep. of Germany

[73] Assignee: Chemische Werke Hüls AG, Marl, Fed. Rep. of Germany

[21] Appl. No.: 908,751

[22] Filed: May 23, 1978

[30] Foreign Application Priority Data

Jul. 8, 1977 [DE] Fed. Rep. of Germany ....... 2730923

[51] Int. Cl.² ............................................. B01J 13/00
[52] U.S. Cl. .............................. 252/312; 106/287.16; 252/314; 252/321; 252/358; 252/DIG. 17
[58] Field of Search ............... 252/312, 314, DIG. 17; 106/287.16

[56] References Cited

U.S. PATENT DOCUMENTS

| | | | |
|---|---|---|---|
| 2,420,329 | 5/1947 | Shipp et al. ...................... | 252/312 X |
| 2,684,949 | 7/1954 | McMillan et al. ............... | 252/312 X |
| 2,755,194 | 7/1956 | Volkmann et al. ............... | 252/312 X |
| 3,101,301 | 8/1963 | Siegal et al. ...................... | 252/312 X |
| 3,634,285 | 1/1972 | Brooks ................................ | 252/312 |

*Primary Examiner*—Richard D. Lovering
*Attorney, Agent, or Firm*—Gilbert L. Wells

[57] ABSTRACT

Method for the preparation of aqueous, finely dispersed, shelf-stable silicone oil emulsions with the use of emulsifiers. Dimethyl polysiloxanes and 0.1–0.3 part by weight of emulsifiers, based on the dimethyl polysiloxanes, of a monoester or diester of orthophosphoric acid or mixtures thereof, are mixed, with agitation at temperatures of between 20° and 150° C. until a clear solution is obtained; thereupon an organic base or alkali is added up to neutralization; and subsequently the neutralized mixture is diluted with water.

The monoesters and diesters of orthophosphoric acid and mixtures thereof comprising the emulsifiers are prepared by the reaction of:

(a) 1-n-octanol or 1-n-octenol with $P_2O_5$, or
(b) straight-chain primary alcohols of 6-10 carbon atoms with phosphoric acids or phosphorus halogenides, or
(c) mixtures of primary alcohols of an average molecular weight of 110 to 160, which are straight-chain to an extent of at least 50 molar percent and contain 1-22 carbon atoms, with phosphoric acids, phosphorus oxides, or phosphorus halogenides.

4 Claims, No Drawings

METHOD FOR THE PRODUCTION OF AQUEOUS, FINELY DISPERSED, SHELF-STABLE SILICONE OIL EMULSIONS

CROSS REFERENCE TO A RELATED APPLICATION

Applicants claim priority under 35 USC 119 for application P 27 30 923.5 filed July 8, 1977 in the Patent Office of the Federal Republic of Germany.

BACKGROUND OF THE INVENTION

The field of the invention is emulsions of silicone fluids in water and the present invention is particularly concerned with an improvement in the method of making emulsions of dimethyl silicone fluids.

The state of the art of dimethyl silicone fluids and emulsifying methods therefore may be ascertained by reference to the Kirk-Othmer "Encyclopedia of Chemical Technology", 2nd Edition, Volume 18 (1959), pp. 221-260 under the Section Silicones, particularly pp. 237-241 where dimethyl silicone fluids are disclosed, and p. 249 where emulsions of silicone fluids are disclosed and British Pat. Nos. 808,193 and 915,787 and U.S. Pat. No. 2,755,194 where emulsifying methods are defined. These references are incorporated herein.

Water-dilutable oil-in-water emulsions are an especially preferred form of using the silicone oils or fluids. In this form, they are employed, for example, to render materials hydrophobic, for defrothing purposes, for the application of thin films for release purposes, for lustering, for increasing the slip and for improving the hand of textile materials. As is known, great difficulties are encountered in the production of finely dispersed, aqueous silicone oil emulsions (see "Ullmanns Enzyklopaedie der technischen Chemie" [Ullmann's Encyclopedia of Technical Chemistry] third edition, 1964, vol. 15, p. 783, fifth paragraph), the disclosure of which is incorporated herein.

Although several emulsifying methods are known from British Pat. Nos. 808,193 and 915,787 and U.S. Pat. No. 2,755,194, column 2, these operate with the aid of homogenizing devices and/or with the use of solvents in addition to the emulsifiers. In spite of the expensive manufacturing process, these emulsions are generally of insufficient stability with regard to shelf life. Furthermore, these emulsions, due to their solvent content, are poorly or not at all suitable for certain usages, such as, for example, for textile preparations.

SUMMARY OF THE INVENTION

Having in mind the limitations of the prior art, it is an object of the present invention to provide a method of emulsifying dimethyl silicone fluids which avoids the complications of homogenizing and the use of solvents in the production of shelf-stable silicone oil emulsions.

A process has now been discovered for the production of aqueous, finely dispersed, shelf-stable silicone oil emulsions with the use of emulsifiers, which is characterized by mixing, under agitation at temperatures of between 20° and 150° C., dimethyl polysiloxanes and 0.1-0.3 parts by weight, based on the dimethyl polysiloxane, of an emulsifier comprising a mono- or diester of orthophosphoric acid or mixtures thereof, until a clear solution is obtained; thereupon adding an organic base or alkali up to neutralization; and subsequently diluting with water.

The emulsifiers comprising monoesters of orthophosphoric acid, diesters of orthophosphoric acid and mixtures thereof are prepared by the reaction of (a) 1-n-octanol or 1-n-octenol with $P_2O_5$, or (b) straight-chain primary alcohols or 6-10 carbon atoms with phosphoric acids or phosphorus halogenides, or (c) mixtures of primary alcohols of an average molecular weight of 110 to 160, which are straight-chain to an extent of at least 50 molar percent and contain 1-22 carbon atoms, with phosphoric acids, phosphorus oxides, or phosphorus halogenides.

Advantageously, the partial ester of orthophosphoric acid according to (c) has been obtained by the reaction of mixtures of alcohols having 4-14 carbon atoms with inorganic phosphorus compounds.

Preferably, dimethyl polysiloxane and the partial ester of orthophosphoric acid are mixed together at 75°-90° C.

In a preferred embodiment of the present method, the organic base employed is a primary, secondary, or tertiary amine of 2-8 carbon atoms.

In another preferred embodiment, the silicone oil is mixed with 0.15-0.2 part by weight of the partial ester of orthophosphoric acid.

The order of adding ingredients is critical and if one does not proceed along the lines of the present invention, although using as the emulsifier an alkali salt or amine salt of an orthophosphoric acid partial ester, unstable emulsions are formed as can be seen from the comparative examples wherein the dimethyl polysiloxanes, emulsifiers and neutralizing bases are added simultaneously according to the prior art.

DESCRIPTION OF THE PREFERRED EMBODIMENTS

Dimethyl polysiloxanes which are converted according to the present invention into aqueous, finely dispersed, shelf-stable emulsions exhibit viscosities of 1 to 500,000 centistokes, especially 100-100,000 cs., at 25° C. They satisfy the general formula $(CH_3)_3$—$SiO[SiO$—$(CH_3)_2]_n$—$SiO$—$(CH_3)_3$.

According to the invention, the following orthophosphoric acid partial esters can be used, for example, in the first stage: n-hexyl-, n-hexenyl-, n-octyl, n-octenyl, n-decyl-, n-decenyl-phosphoric acid mono- and diesters and mixtures thereof, as well as orthophosphoric acid mono- and diesters of mixtures of alcohols containing 1-22 carbon atoms.

Specific examples of the esters of orthophosphoric acids of (a) include a mixture of mono-n-octyl orthophosphoric acid ester and di-n-octyl-orthophosphoric acid ester, a mixture of mono-n-octenyl orthophosphoric acid ester and di-n-octenyl orthophosphoric acid ester.

Specific examples of the monoesters and diesters of orthophosphoric acids of (b) include a mixture of mono-n-hexyl orthophosphoric acid ester and di-n-hexyl orthophosphoric acid ester; a mixture of mono-n-heptyl orthophosphoric acid ester and di-n-heptyl orthophosphoric acid ester; a mixture of mono-n-octyl-orthophosphoric acid ester and di-n-octyl orthophosphoric acid ester, and a mixture of mono-n-decyl-orthophosphoric acid ester and di-n-decyl-orthophosphoric acid ester.

Specific examples of the monoesters and diesters of orthophosphoric acids of (c) include a mixture of orthophosphoric acid monoesters and orthophosphoric acid diesters of a mixture of 0.7% methanol, 1.3% n-butanol, 3.2% n-hexanol, 1.1% 2-ethyl-hexanol, 86.4% n-octanol, 5.2% n-dodecanol and 2.1% n-oleyl-alcohol, prepared by the reaction of the alcohol-mixture with (a) phosphorus oxichloride ($POCl_3$), and (b) phosphorus oxide ($P_2O_5$).

Suitable alkalis for the neutralizing components are, for example, ammonium, potassium, sodium and lithium hydroxides. Especially preferred are organic bases, for example:

1. primary aliphatic amines, such as ethylamine, n-propylamine, n-butylamine, pentylamine, isobutylamine, monoethanolamine, 1,3-aminopropanol. Also suitable are primary aliphatic amines, the alkyl residue of which carries substituents, for example heterocyclically substituted primary aliphatic amines, such as N-(3-aminopropyl)-morpholine, N-(3-aminopropyl)-piperidine, N-(3-aminoethyl)-morpholine, primary aliphatic amines substituted by alkoxy groups, e.g. diethanolamine, methoxypropylamine, ethoxypropylamine, methoxyethylamine, 2-phenoxyethylamine, 3-phenoxypropylamine, primary aliphatic amines substituted by dialkylamino groups, such as N,N-dimethylaminopropylenediamine, N,N-diethylaminopropylenediamine, p-aminodimethylaniline;

2. Primary cycloaliphatic amines, such as cyclohexylamine, cyclopentylamine, benzylamine, aniline;

3. Secondary aliphatic and aromatic amines, such as diethylamine, diisopropylamine, di-n-butylamine, di-n-hexadecylamine, dibenzylamine, butylmethylamine, ethylhexadecylamine, N-methylaniline;

4. secondary heterocyclic amines, such as morpholine, piperidine, pyrrolidine, 2,3-dihydroindole;

5. tertiary amines, such as triethylamine, triisopropylamine, tributylamine, triethanolamine, N-oxaethylmorpholine, N-hydroxypropylmorpholine, N-methylmorpholine, pyridine.

Preferably, amines of 2–8 carbon atoms are utilized as the neutralizing components, such as, for example, monoethanolamine, 1,3-aminopropanol, methoxypropylamine, morpholine, N-methylmorpholine, diethanolamine, N-oxaethylmorpholine, diethylamine, diisobutylamine, di-n-butylamine.

The dimethyl polysiloxane and the acidic phosphoric acid partial ester are mixed, in accordance with the invention, at 20°–150° C. under agitation. This means that both components can be combined at room temperature and stirred at this temperature until a clear solution is produced, or alternatively after the components have been combined at room temperature they are then heated under agitation and the agitation is continued at a temperature of up to 150° C. until a clear solution has been obtained. With the use of elevated temperatures, the clear solution is formed very rapidly, while the treatment at room temperature takes a longer period of time.

It is additionally possible to incorporate nonionic products, e.g. of the type of the alkyl and alkylaryl polyalkylene glycol ethers, into the highly concentrated, emulsifier-containing dimethyl polysiloxanes, without substantially affecting their finely dispersed emulsifying effect. The following examples will explain the mode of operation according to the present invention:

EXAMPLE 1

A mixture of 75 parts by weight of a phosphoric acid partial ester obtained by reacting 3 moles of n-octanol with 1 mole of phosphorus pentoxide and 500 parts by weight of a dimethyl polysiloxane oil having a viscosity of 350 cs. at 25° C. was heated under agitation at 100 r.p.m. to 80°–85° C. After about 5 minutes, a clear, viscous liquid was obtained during further agitation in this temperature range from the initially turbid mixture; this liquid was cooled to 30°–40° C. and neutralized with 20 parts by weight of monoethanolamine at the aforementioned agitating speed. Subsequently 595 parts by weight of water was added during a period of 15 minutes under agitation at 200 r.p.m., thus obtaining a finely dispersed, thinly fluid emulsion which did not exhibit any changes either in the centrifuge test or in the standing test over a period of 5 months.

EXAMPLE 1(a)

The procedure of Example 1 was followed, using in place of monoethanolamine 24.0 parts by weight of n-butylamine. A finely dispersed, thinly fluid emulsion was thus obtained showing no changes either in the centrifuge test or in the standing test over a period of 5 months.

EXAMPLE 1(b)

The procedure analogously to Example 1 was employed, utilizing 32.0 parts by weight of cyclobutylamine instead of monoethanolamine. A finely dispersed, thinly fluid emulsion was produced in this way, which did not show any changes either in the centrifuge test or in the standing test over a period of 5 months.

EXAMPLE 1(c)

The process was used as described in Example 1, using in place of monoethanolamine 23.5 parts by weight of diethylamine, thus obtaining a finely dispersed, thinly fluid emulsion showing no changes in the centrifuge test or in the standing test over a period of 5 months.

EXAMPLE 1(d)

The procedure was analogous to Example 1, but using 26.0 parts by weight of morpholine in place of monoethanolamine, thus producing a finely dispersed, thinly fluid emulsion which did not show any changes either in the centrifuge test or in the standing test over a period of 5 months.

EXAMPLE 1(e)

The process was followed analogously to Example 1, but using 31.2 parts by weight of N-methylmorpholine instead of monoethanolamine. A finely dispersed, thinly fluid emulsion was obtained which showed no changes in the centrifuge test or in the standing test over a period of 5 months.

COMPARATIVE EXAMPLE 1

For comparison purposes, 95 parts by weight of emulsifier consisting of 75 parts by weight of a phosphoric acid partial ester obtained by reacting 3 moles of n-octanol with 1 mole of phosphorus pentoxide and 20 parts by weight of monoethanolamine was mixed with 500 parts by weight of a dimethyl polysiloxane oil having a viscosity of 350 cs. at 25° C., heated under agitation at 100 r.p.m. to 80°–85° C. and then diluted with 595 parts by weight of water, thus producing a coarsely dispersed emulsion which separated already after a short period of time.

EXAMPLE 2

Analogously to the mode of operation of the invention in Example 1, an emulsion was prepared, using in place of the dimethyl polysiloxane oil with a viscosity of 350 cs. a dimethyl polysiloxane oil with a viscosity of 1,250 cs. A finely dispersed, thinly fluid emulsion was thus obtained which showed no changes either in the centrifuge test or in the standing test over a period of 5 months.

COMPARATIVE EXAMPLE 2

For comparison purposes, the procedure was followed in accordance with Comparative Example 1, thus obtaining a coarsely disperse emulsion which separated already after a brief period of time.

EXAMPLE 3

Analogously to the mode of operation according to the invention as set forth in Example 1, an emulsion was produced, using in place of the dimethyl polysiloxane oil with a viscosity of 350 cs. a dimethyl polysiloxane oil having a viscosity of 60,000 cs., thus obtaining a slightly viscous, finely dispersed emulsion which showed no changes either in the centrifuge test or in the standing test over a period of 5 months.

COMPARATIVE EXAMPLE 3

For comparison purposes, the procedure was followed as disclosed in Comparative Example 1, thus producing a coarsely disperse emulsion which separated already after a short period of time.

EXAMPLE 4

Analogously to the mode of operation described in Example 1 according to this invention, an emulsion was prepared, using, in place of the n-octylphosphoric acid partial ester, a reaction product from 3 moles of an alcohol mixture, having a C number of 6–10 and an average molecular weight of 130, and 1.05 mole of phosphorus pentoxide. A finely dispersed, thinly fluid emulsion was thus obtained which showed no changes either in the centrifuge test or in the standing test over a period of 5 months.

COMPARATIVE EXAMPLE 4

For comparison purposes, the process was followed as set out in Comparative Example 1, thus obtaining a coarsely disperse emulsion which separated already after a short period of time.

EXAMPLE 5

Analogously to the procedure of this invention as disclosed in Example 1, an emulsion was prepared using in place of monoethanolamine 24.5 parts by weight of 1,3-aminopropanol. A finely dispersed, thinly fluid emulsion was thus produced which showed no changes either in the centrifuge test or in the standing test over a period of 5 months.

COMPARATIVE EXAMPLE 5

For comparison purposes, the process was followed as indicated in Comparative Example 1, thus obtaining a coarsely disperse emulsion which separated already after a short period of time.

EXAMPLE 6

Analogously to the mode of operation according to the invention as disclosed in Example 1, a mixture of 500 parts by weight of a dimethyl polysiloxane oil with a viscosity of 60,000 cs. at 25° C., 50 parts by weight of n-octylphosphoric acid partial ester according to Example 1, and 25 parts by weight of an ethoxylation product from nonyl phenol and 3 moles of ethylene oxide was treated until a clear solution was obtained and then neutralized with 14.6 parts by weight of monoethanolamine. Subsequently, 595 parts by weight of water was gradually stirred into the mixture, thus obtaining a finely dispersed, thinly fluid emulsion which showed no changes either in the centrifuge test or in the standing test over a period of 3 months.

Accordingly, the process of this invention makes it possible to prepare shelf-stable silicone oil emulsions without the addition of solvents and without homogenization.

The emulsions obtained in accordance with this invention are universally useful, since they do not contain any solvent. Furthermore, the preparation of these emulsions requires substantially less expenditure, as compared with the prior art, since the homogenizing stage is eliminated.

We claim:

1. A method for the preparation of aqueous, finely dispersed, shelf-stable silicone oil emulsions, consisting essentially of the following steps in order:
   (A) mixing with agitation at a temperature of about 20° to 150° C., dimethyl polysiloxanes and about 0.1–0.3 part by weight, based on said dimethyl polysiloxanes of an emulsifier and obtaining a clear solution;
   (B) neutralizing said clear solution with a basic material selected from the group consisting of organic and alkali bases; and
   (C) diluting with water; wherein said emulsifier is selected from orthophosphoric acid partial esters consisting of monoesters of orthophosphoric acid, diesters of orthophosphoric acid and mixtures thereof, prepared by the reaction of:
   (a) 1-n-octanol or 1-n-octenol with $P_2O_5$,
   (b) straight-chain primary alcohols having 6–10 carbon atoms with phosphoric acids or phosphorus halogenides, or
   (c) mixtures of primary alcohols having an average molecular weight of 110 to 160, which are straight-chain to an extent of at least 50 molar percent and contain 1–22 carbon atoms, with phosphoric acids, phosphorus oxides, or phosphorus halogenides.

2. The method of claim 1, wherein said phosphoric acid partial esters according to (c) are obtained by reacting mixtures of alcohols containing 4–14 carbon atoms with inorganic phosphorus compounds.

3. The method of claim 1, wherein said dimethyl polysiloxanes and said phosphoric acid partial esters are mixed together at 75°–90° C.

4. The method of claim 1, wherein primary, secondary, or tertiary amine having 2–8 carbon atoms are said organic bases.

* * * * *